Feb. 26, 1952     T. FINIZIE     2,587,133
SPIT-HANDLING DEVICE

Filed Nov. 19, 1948     2 SHEETS—SHEET 1

Inventor
Tomun Pinizie
By Rowell & Bartholow
ATTORNEYS

Feb. 26, 1952 T. FINIZIE 2,587,133
SPIT-HANDLING DEVICE
Filed Nov. 19, 1948 2 SHEETS—SHEET 2
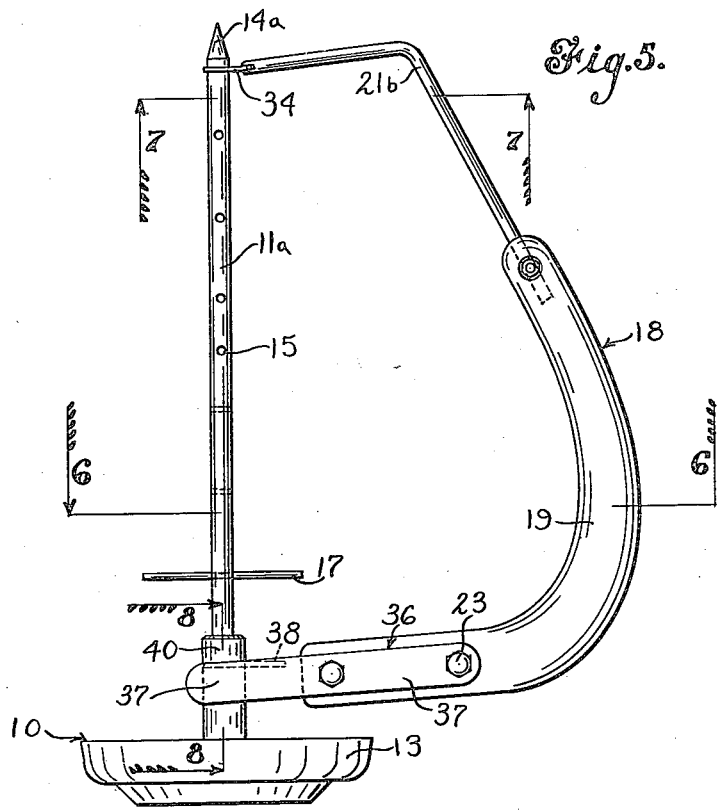
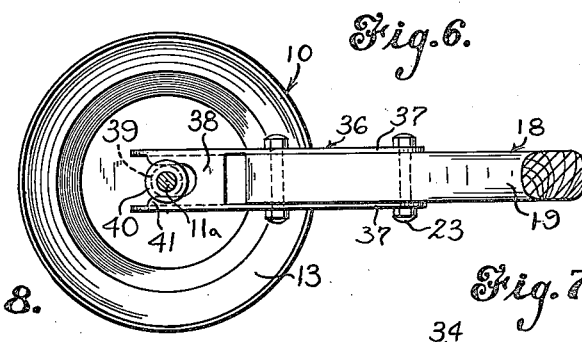
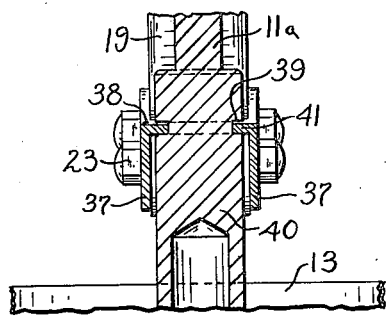
ATTORNEYS Patented Feb. 26, 1952

2,587,133

UNITED STATES PATENT OFFICE 2,587,133

SPIT-HANDLING DEVICE

Tomun Finizie, Bridgeport, Conn.

Application November 19, 1948, Serial No. 61,090

2 Claims. (Cl. 99—419)

This invention relates to food-handling devices or supports, and more particularly to devices for lifting and handling articles of food, such as chickens or roasts, supported on portable spits.

The device is particularly advantageous when employed in connection with cooking apparatus of the general type illustrated in the L. T. Finizie Patent No. 2,377,873, according to the disclosure of which revoluble vertical spits provided with underlying drip pans are adapted to be placed within and removed from an interiorly heated cooking chamber, but the device can be used in connection with cooking apparatus of other types.

One of the objects is to provide means whereby the spit unit comprising the spit and the underlying drip pan can be conveniently lifted and handled for purposes of placing the article of food in position to be cooked.

Another object is to provide a device which is especially convenient and useful in removing the hot, cooked article from a hot cooking chamber without burning or soiling the operator.

Another object is to provide an improved lifter and support assembly for an article of food which is to be placed in a cooking chamber or oven for cooking, and when cooked, removed from the chamber or oven.

In the accompanying drawings:

Fig. 5 is a view similar to Fig. 1, showing a further modification; and

Figure 1:
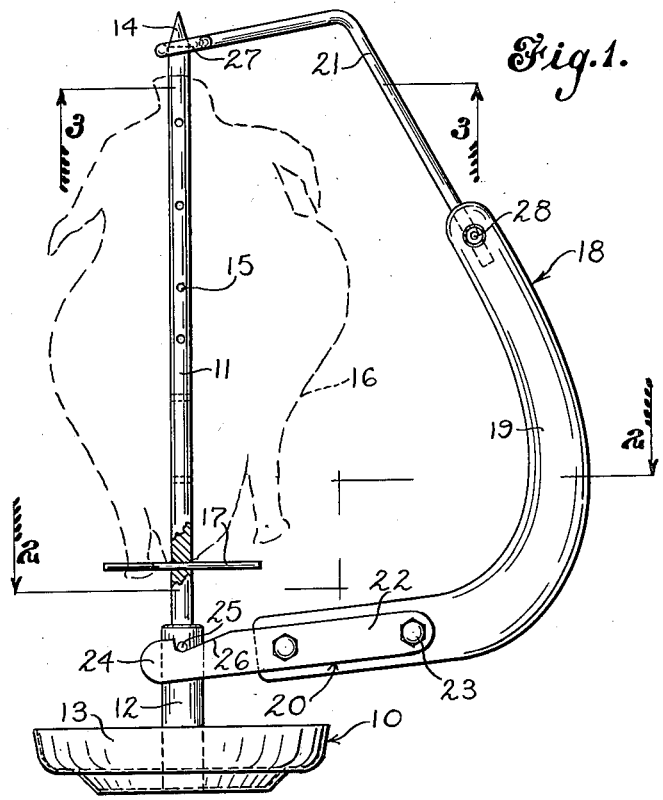
Fig. 1 is a side elevation of a food-handling device embodying my improvements, showing the lifting and carrying member applied to the spit unit.

Figs. 6, 7 and 8 are sections on lines 6—6, 7—7 and 8—8, respectively, of Fig. 5.

In the drawings there is illustrated a spit unit generally similar to the unit illustrated in the L. T. Finizie Patent 2,377,873, comprising a vertical upwardly extending spit pointed at the upper end and connected rigidly at the lower end with a drip pan for grease and moisture which serves as a support for the spit. In this particular case the unit is adapted to be revolved in a suitable manner while disposed in a cooking chamber into which it is introduced for cooking the article of food, and from which it is removed when cooking is completed. In association with this spit unit there is employed a lifting and carrying member which is generally in the form of a yoke having a lower extremity which is adapted to be connected to the lower end of the spit and an upper extremity that is adapted to be connected to the upper end of the spit, the connections of the yoke member with the spit being detachable connections, so that, after the lifting and carrying of the spit unit has been completed, the carrying member may be quickly detached. The yoke-like form given to the carrying member enables the latter to be applied to the spit unit without interference from the article of food supported on the spit, and also enables the carrying member to be manipulated by the operator in a convenient manner. For purposes of convenient manipulation, the lower part of the carrying member or yoke is provided with a handle portion which may be readily grasped by the operator, and is at some distance from the article of food, so that it will not be unduly heated by heat from the cooked article.

In the drawings, the spit unit is generally indicated at 10, the same comprising a spit 11 having a supporting sleeve portion 12 which is rigidly connected to a drip pan 13 at the bottom of the latter. The upper end of the spit 11 is pointed, as shown at 14. The spit is also provided with a number of through transverse openings 15. An article of food 16, such as a chicken, can be impaled upon the spit and supported from beneath at a proper elevation by means of a pin 17 extending through one of the openings 15.

The lifting and carrying member is generally indicated at 18, the same having a lower bow-like handle portion 19, which may be conveniently formed of wood or the like, a lower metal portion 20 providing the lower extremity of the yoke, and an upper metal portion 21 providing the upper extremity of the yoke.

Figure 2:
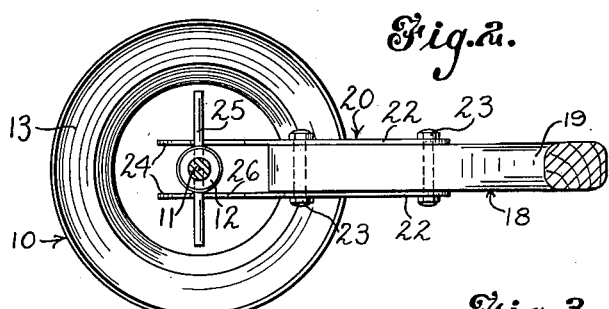
Fig. 2 is a section on line 2—2 of Fig. 1.

The lower metal portion 20 comprises a duplex plate structure, including side plates 22 rigidly attached as by bolts 23 to the lower end of member 19 and projecting beyond member 19 to provide a fork, indicated at 24, which may be engaged with a transverse projecting pin 25, which in this case is rigidly secured to the upper part of the sleeve 12 of the spit. The pin 25 projects from the spit at both sides, and the tines of the fork portion 24 are provided with notches 26 in which the pin 25 is received, as shown in Figs. 1 and 2, when the carrying member is in the operative position. In this position, as will be noted from Fig. 2, the tines of the fork 24 lie close to the sleeve 12, and the ends of the pin 25 project considerably beyond the fork in a lateral direction. The notches 26 preferably have the form shown in Fig. 1, providing a shoulder at the left-hand side of the notch (Fig. 1), and a slope or incline leading up to the upper edge of the fork.

Figure 3:
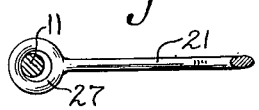
Fig. 3 is a section on line 3—3 of Fig. 1.

The upper metal portion 21 of the carrying member may be conveniently in the form of a rod bent intermediate of its ends in the manner shown in Fig. 1, and having at one extremity an eye 27 adapted to engage the upper extremity of the spit with some lateral clearance, as shown in Fig. 3. The other end of the rod-like portion 21 may be rigidly attached to the upper end of the handle member 19 in a convenient manner, so as to provide a rigid connection. In the case shown, the lower end of the portion 21 is extended into a bore in the upper end of member 19 and is fastened in place rigidly by means such as a clamping bolt 28.

In placing the carrying member on the spit unit, the eye 27 is placed over the upper end of the spit while the operator's hand grasps the handle portion, and the lower end of the carrying member is then advanced laterally toward the spit so that the lower fork is projected under and engaged with the transverse pin. Then, as the handle is raised, the spit unit will be carried upwardly, and it can be easily transported while effectively controlled from lateral displacement relatively to the carrying member. After the article of food has been properly placed and located upon the spit, the carrying member may be used in placing the food article in the cooking chamber or oven in a convenient manner, and it will be obvious without further explanation how the carrying member may be utilized with great speed and convenience and sanitary care in removing the food article from the cooking apparatus after it has been cooked.

In a cooker of the type shown in the Finizie patent above mentioned, the cooking chamber has a lower opening which is closed by a vertically movable base member or support on which the food is placed, and from which it is removed after the cooking operation, and the handling of the food in this manner is greatly facilitated by the use of the device illustrated, but the latter obviously is of advantage in connection with cooking apparatus of other types.

Figure 4:
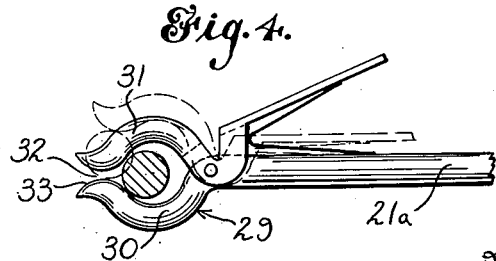
Fig. 4 is a fragmentary view, showing a modified form.

In the modification shown in Fig. 4, the upper rod-like portion 21ª of the carrying member is provided, as a substitute for the eye, with a spring-pressed jaw structure 29 which comprises a fixed jaw 30 and a movable jaw 31. These jaws are normally separated from each other, as indicated at 32, in the closed position, and their opposing parts have slanting surfaces 33, so that the upper portion of the carrying member may be assembled with the spit by being pressed against it in a lateral direction. With such a construction it is unnecessary to have the upper extremity of the carrying member move vertically with respect to the spit in placing the carrying member in operative position.

In the modified form shown in Figs. 5 to 8, inclusive, the upper rod portion 21ᵇ of the carrying member is provided at the extremity with a fork of sheet metal, indicated at 34, which is adapted to be engaged with an annular groove 35 provided in the spit 11ª at a point somewhat below the upper conical extremity 14ª of the spit. The lower metal portion 36, attached to the handle member, comprises side plates or cheek plates 37, similar to those previously described, but these support at their upper parts a bridge member 38 which is notched or slotted to provide a fork structure that will engage in an annular groove 39 provided in the sleeve member or spit extension 40. The lateral portions of the engaging fork which enter the groove 39 are indicated at 41. It will be apparent that in placing the carrying member in operative position, it will be advanced laterally toward the spit so as to engage its extremities in the grooves of the spit, and the carrying member may be removed from the spit by moving the carrying member laterally in the opposite direction.

The greater part of the weight of the spit unit and the article of food when they are being carried is supported by the lower arm of the carrying member, and the upper end of the carrying member serves as a means to control from lateral displacement the upper end of the spit. Preferably the lower part of the carrying member, including a part of the handle, is horizontally disposed, and a considerable part of the upper portion of the carrying member is at an acute angle to the spit, in the operative position. In the forms shown, the grasping portion of the handle is a smooth portion, curved on a fairly large radius, provided in the location where the approximately horizontal portion of the carrying member is joined to the slightly inclined upwardly extending portion.

In the form shown in Figs. 1 to 3, inclusive, a positive pull of the spit unit toward the right of Fig. 1 is provided for at the lower end of the yoke, owing to the described shape of the notch 26. The movement in this direction may be that required for moving the cooked food article away from the cooking chamber, in which connection a positive lateral movement of the spit unit may be advantageous.

In all the cases illustrated, the food article is held at a certain elevation by the pin 17, so that it cannot drop down upon and interfere with the operation of the lower end of the yoke.

While several forms of the invention are herein disclosed, other modifications may be adopted, and various changes made in the details without departing from the principles of the invention or the scope of the claims.

What I claim is:

1. In combination with a spit unit comprising an upwardly directed spit carrying at its lower part an underlying pan, the spit being adapted to support a food article above the pan, a lifting and carrying device having manually detachable connections with the spit unit at points above and below the food article on the spit, the upper connection being adjacent the upper end of the spit and the lower connection somewhat above the pan, and means engaged with the spit for preventing the food article from moving down into engagement with said device, said device being constituted by a yoke which straddles the food article.

2. In combination with a spit unit comprising an upwardly directed spit carrying at its lower part an underlying pan, the spit being adapted to support a food article above the pan, a lifting and carrying device having manually detachable connections with the spit unit at points above and below the food article on the spit, the upper connection being adjacent the upper end of the spit and the lower connection somewhat above the pan, and means engaged with the spit for preventing the food article from moving down into engagement with said device, said device being constituted by a yoke having an intermediate curved handle portion spaced laterally from the spit so as to be at some distance from the food article supported thereon.

TOMUN FINIZIE.

REFERENCES CITED

The following references are of record in the file of this patent:

UNITED STATES PATENTS

| Number | Name | Date |
|---|---|---|
| 155,789 | Camp | Oct. 13, 1874 |
| 175,050 | Dejey | Mar. 21, 1876 |
| 248,698 | Branch | Oct. 25, 1881 |
| 420,916 | McIntire | Feb. 4, 1890 |
| 536,986 | Dunlap | Apr. 2, 1895 |
| 559,720 | Lacroix | May 5, 1896 |
| 902,236 | Kintz | Oct. 27, 1908 |
| 902,724 | Giovanna | Nov. 3, 1908 |
| 1,337,122 | Doak | Apr. 13, 1920 |
| 1,860,577 | Hedge | May 31, 1932 |
| 2,127,658 | Walterspiel | Aug. 23, 1938 |
| 2,181,847 | Finizio | Nov. 28, 1939 |
| 2,308,744 | Buys | Jan. 19, 1943 |
| 2,377,873 | Finizie | June 12, 1945 |

FOREIGN PATENTS

| Number | Country | Date |
|---|---|---|
| 2,401 | Great Britain | June 12, 1880 |
| 333,941 | Italy | Jan. 17, 1936 |